United States Patent [19]

Hawman et al.

[11] Patent Number: 5,423,316
[45] Date of Patent: Jun. 13, 1995

[54] AUTOMATIC IDENTIFICATION OF ANATOMICAL FEATURES OF INTEREST FROM DATA ACQUIRED IN NUCLEAR MEDICINE STUDIES AND SUPERIMPOSITION OF SUCH FEATURES OF PERSISTENCE SCOPE DISPLAYS

[75] Inventors: Peggy C. Hawman, Schaumburg; Jianzhong Qian, Lawrenceville, both of Ill.

[73] Assignee: Siemens Medical Systems, Inc., Iselin, N.J.

[21] Appl. No.: 183,451

[22] Filed: Jan. 18, 1994

Related U.S. Application Data

[63] Continuation of Ser. No. 896,692, Jun. 10, 1992, abandoned, which is a continuation-in-part of Ser. No. 848,769, Mar. 10, 1992.

[51] Int. Cl.⁶ .............................................. A61B 6/00
[52] U.S. Cl. ................................ 128/653.1; 128/654; 128/659; 250/363.02; 382/128
[58] Field of Search .................... 128/653.1, 654, 659; 382/6, 25, 26; 378/20, 62; 250/363.02, 363.04, 369; 364/413.19, 413.22; 606/130

[56] References Cited

U.S. PATENT DOCUMENTS

| | | | |
|---|---|---|---|
| 3,979,594 | 9/1976 | Anger | 250/369 |
| 4,101,961 | 7/1978 | Reiber | 382/6 |
| 4,200,793 | 4/1980 | Nagasawa et al. | 250/363.02 |
| 4,223,353 | 9/1980 | Keller et al. | 358/230 |
| 4,245,646 | 1/1981 | Ionnou et al. | 128/653.1 |
| 4,404,973 | 9/1983 | Lancaster et al. | 128/654 |
| 4,598,368 | 7/1986 | Umemura | 250/369 |
| 4,629,989 | 12/1986 | Riehl et al. | 324/318 |
| 4,659,935 | 4/1987 | Hawman | 250/363.04 |
| 4,922,915 | 5/1990 | Arnold et al. | 128/653.1 |
| 4,961,425 | 10/1990 | Kennedy et al. | 128/653.1 |
| 5,036,463 | 7/1991 | Abela et al. | 364/413.13 |
| 5,038,786 | 8/1991 | Kojima | 128/653.2 |
| 5,081,992 | 1/1992 | Levin et al. | 128/653.2 |
| 5,099,846 | 3/1992 | Hardy | 128/653.2 |

FOREIGN PATENT DOCUMENTS 0389968 3/1990 European Pat. Off. .
4-90076 3/1992 Japan .

OTHER PUBLICATIONS

IEEE Transactions, vol. 7, No. 3, pp. 246–259 (May 1985), A knowledge Based System for Analysis of Gated Blood Pool Studies, Niemann, Bunke, Hofmann, Sagerer, Wolf and Feistel.
Cahill & Knowles, Software reliability and algorithm validation for medical imaging, Medical Physics, vol. 12, No. 5, pp. 575–580 (Oct. 1985).
Proceedings of the 1986 IEEE International Conference, pp. 211–215 (Oct. 14–17, 1986), Boyd & Stein.
Optical Engineering, vol. 20, No. 5, pp. 719–725 (Oct. 1981), Digital boundary detection techniques for the analysis of gated cardiac scintigram, Hawman.
Proceedings of the IEEE Engineering in Medicine and Biology Society (Nov. 9–12, 1989), pp. 578–579, Boire, Cauvin, Maublant, & Veyre, Automatic Alignment of Thallium-201 Myocardial Tomographic Views.
Computers in Cardiology, (Sep. 12–15, 1987), pp. 191–194, Sitomer, Sanz, Anselmo, Simon & LeFree, Computer-Aided Gantry Positioning for Improved . . .

*Primary Examiner*—Lee S. Cohen
*Assistant Examiner*—Brian L. Casler
*Attorney, Agent, or Firm*—Mark H. Jay

[57] ABSTRACT

Anatomical landmarks relating to a target organ which is to be studied in a nuclear medicine study are automatically identified by a computer. The landmarks are superimposed upon a nuclear medicine persistence image of the target organ. This facilitates technician identification of the target organ and also facilitates repeatability of, e.g., myocardial perfusion studies, which require that two studies be performed on a single patient at two different times.

4 Claims, 3 Drawing Sheets

AUTOMATIC IDENTIFICATION OF ANATOMICAL FEATURES OF INTEREST FROM DATA ACQUIRED IN NUCLEAR MEDICINE STUDIES AND SUPERIMPOSITION OF SUCH FEATURES OF PERSISTENCE SCOPE DISPLAYS

CROSS-REFERENCE TO RELATED APPLICATIONS

This is a continuation of Ser. No. 07/896,692, filed Jun. 10, 1992, now abandoned, which is a continuation-in-part of commonly-owned application application No. 07/848,769, filed Mar. 10, 1992. The entire disclosure of this application, including the drawings, is hereby incorporated herein by reference as if fully set forth.

BACKGROUND OF THE INVENTION

The invention relates to nuclear medicine, and more particularly relates nuclear medicine studies of patient organs, such as the heart. In its most immediate sense, the invention relates to proper positioning of a patient in nuclear medicine studies of patient organs.

In some nuclear medicine studies, such as bone scans, it is easy to properly position a patient with respect to the detector of a scintillation camera. However, in other studies, particularly studies of organs such as the heart, such proper positioning is difficult because many relevant factors (e.g. orientation of the heart within the patient's body, size of the various portions of the heart) are not known before the study is commenced. In these latter instances, a nuclear medicine study is usually commenced by positioning the detector of the scintillation camera in approximately the correct orientation, verifying the correctness of the position originally selected, and adjusting the position as necessary. The verification step is usually carried out by viewing a persistence image of the Region Of Interest (ROI) on the camera display.

There are two major disadvantages to this approach. First, when using a focussing collimator, it can be difficult for a technician to identify the anatomic feature of interest (for example, the patient's left ventricle) because its appearance can be quite distorted by the focussing scheme. Second, even if the anatomic feature of interest is identified, the positioning is not highly repeatable. Thus, for example, in cardiac myocardial perfusion tests, it is advantageous to conduct a first study with the patient at Zest and a second study after stressing the patient. The patient should be in the same position in both studies. If the location of e.g. the heart within the ROI is only known in a general way, the patient's position during the second study will not precisely replicate the patient's position during the first study.

It would be advantageous to help a technician identify an anatomic feature of interest, even when the feature appears in a distorted manner because a focussing collimator is being used to conduct the study.

It would also be advantageous to provide method and apparatus which would make patient positioning more repeatable.

Therefore, one object of the invention is to provide method and apparatus which will help a technician identify an anatomic feature of interest, even when the feature is displayed in a distorted form.

Another object of the invention is to provide method and apparatus which makes patient positioning more repeatable.

Still a further object is, in general, to improve on known methods and apparatus in nuclear medicine.

In accordance with the present invention, the camera is set up at an initial position and an image (advantageously a persistence image) is acquired. After a predetermined time, the data in the image is computer-analyzed in real time in accordance with the invention disclosed and claimed in the above referenced parent patent application, and a set of position-defining anatomic landmarks of interest (e.g. the left ventricular cardiac muscles of the heart) are thereby identified. (At least two such landmarks are necessary, in order to infer camera position.) A plot of such landmarks is then generated by the computer and the plot is then superimposed upon the part of the persistence image to which the plot relates.

This permits the technician to immediately identify the significant portion of the image and to center (or otherwise locate) that portion on the display. Alternatively, the positioning of the significant portion of the image can be detected by the computer and the technician advised of advantageous adjustments which might be made to the position of the patient and/or the camera detector.

BRIEF DESCRIPTION OF THE DRAWINGS

The invention will be better understood with reference to the following illustrative and non-limiting drawings, in which.

DETAILED DESCRIPTION OF PREFERRED EMBODIMENTS

Although the invention will be described below in connection with a prospective SPECT study of a patient's heart, it will be understood that this is merely an exemplary application. The invention can be adapted to other applications by persons skilled in the art.

Figure 1:
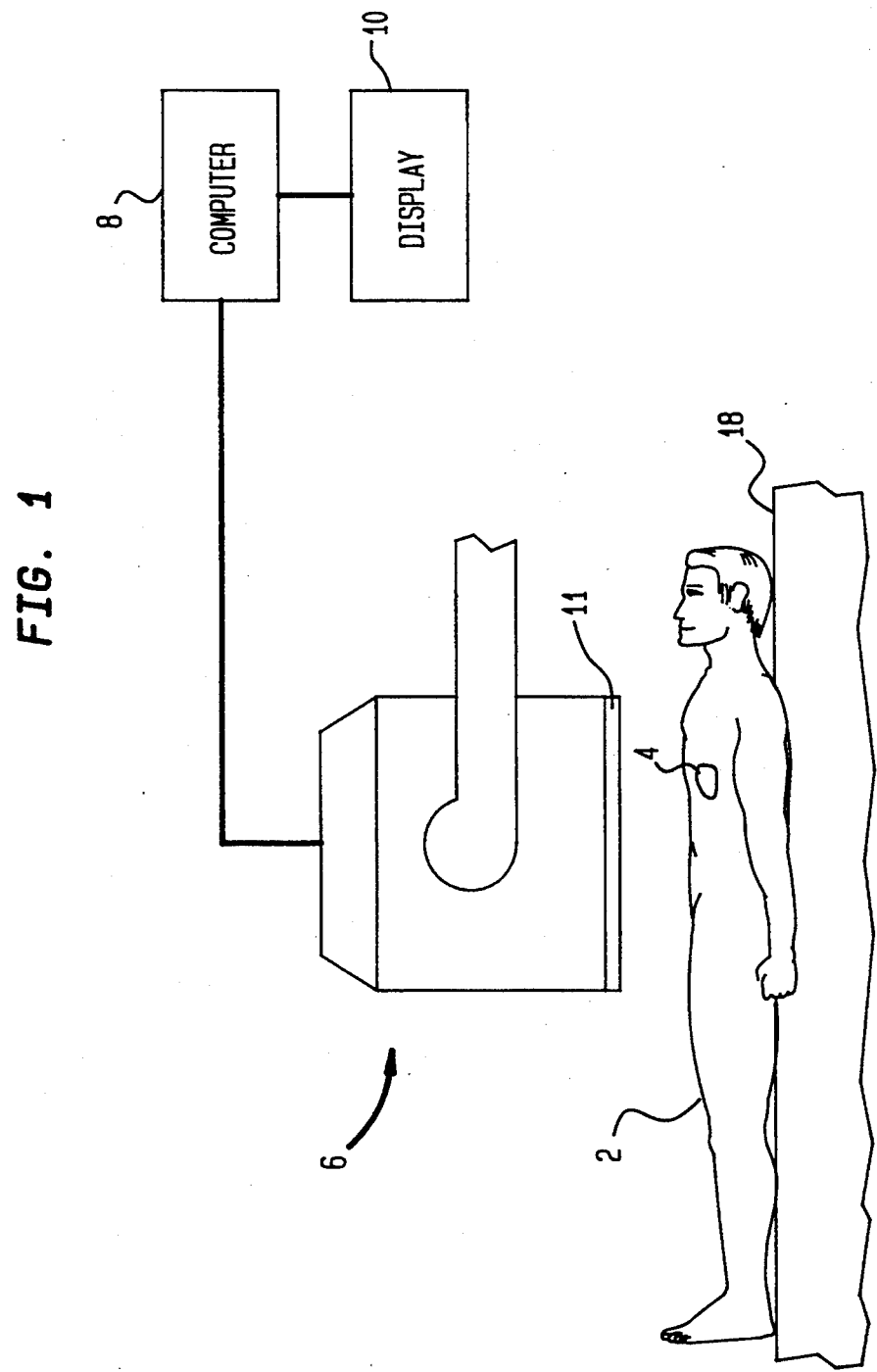
FIG. 1 is a schematic diagram showing a scintillation camera system in accordance with the preferred embodiment of the invention.

Initially, and as is shown in FIG. 1, a cardiac SPECT study is conducted upon a patient 2. In such a study, a radioisotope is administered to the patient 2 and the heart 4 of the patient 2 is imaged using a scintillation camera generally indicated by reference numeral 6. A number of frames of planar images collected by the camera 6 is routed to a computer 8, and the planar image itself may be displayed upon a display 10.

Initially, the patient is placed in position and the technician displays, on display 10, a persistence image of the patient's heart to confirm that the positioning is proper (or to detect mispositioning and to correct it).

In a conventional study, the technician will usually look for particular anatomical landmarks, such as the boundary of the patient's heart. However, if a focussing collimator (such as collimator 11, shown attached to the detector of the camera 6) is used, the persistence images of these landmarks may appear distorted and the technician may not be able to recognize them.

Figure 2:
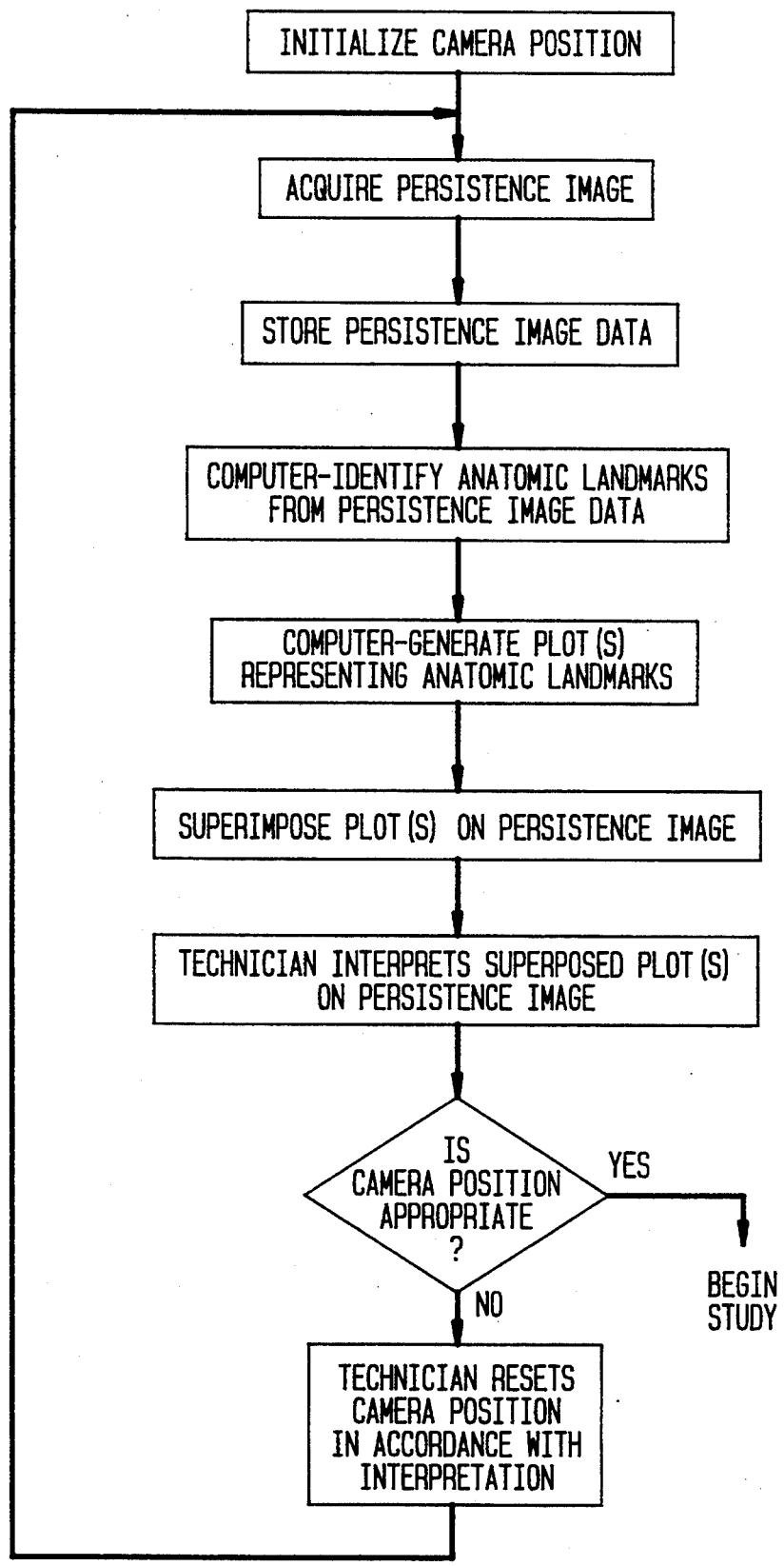
FIG. 2 is a flow chart of a method in accordance with the preferred embodiment of the invention.

Accordingly, in accordance with the preferred embodiment of a method in accordance with the invention (see FIG. 2), the camera 6 is set up at an initial position with respect to the patient 2 and acquisition of a persistence image (which may be displayed on display 10) is commenced. After a predetermined time (perhaps 1 or 2 minutes, but this is not a part of the invention) the accumulated data in the persistence image is analyzed in accordance with the method and apparatus disclosed in copending patent application application No. 07/848,769 filed Mar. 10, 1992. The analysis is carried out in such a manner as to computer-identify a set of anatomic landmarks which define the position of the camera with respect to the organ of interest; in the present instance, wherein the heart 4 is the organ of interest, the computer 8 is programmed to computer-identify the muscles of the left ventricle. After such identification, one or more plots of the landmarks of interest (in this instance, the left ventricular muscles) is computer-generated. Then, these plots are displayed and superimposed upon the corresponding locations in the persistence image. This highlights the features of interest. If the feature is mispositioned within the desired Region of Interest, the orientation of the camera 6 may be changed, either manually by the technician (not shown) with or without a suggested new position calculated by the computer 8, or automatically, under the control of the computer 8. After repositioning, the identification, plotting and superimposition steps are repeated for the new position.

Figure 3A:
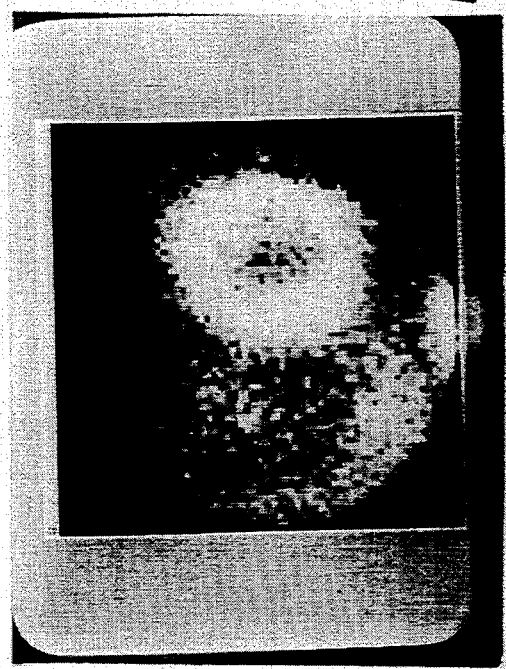
FIG. 3A is a persistence image of a patient's heart, formed using a parallel hole collimator.

The utility of the preferred embodiment of the invention will now be discussed. As can be seen in FIG. 3A, which shows a low-statistics (less than 30 seconds) persistence image on the display 10 that includes the patient's heart 4 and that is formed using a parallel-hole collimator, it can be difficult to identify the location of the patient's heart 4 merely by examining the persistence image. The same point is illustrated in FIG. 4A, which is another low-statistics (less than 30 seconds) persistence image on the display 10 that includes the patient's heart 4 and that is formed using a focussing collimator 11 (in this instance, a fan-beam collimator).

Figure 4B:
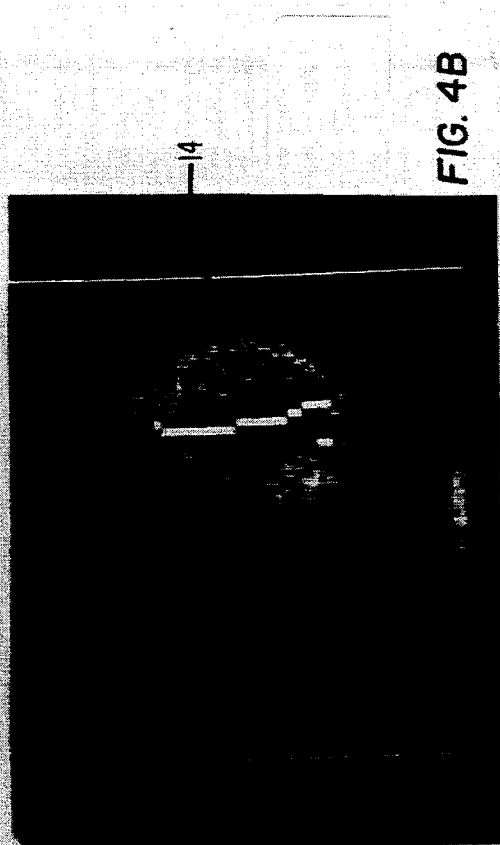
FIG. 4B is a plot of the detected anatomic landmarks in the patient's heart, superimposed upon the image shown in FIG. 4A.
Figure 4A:
FIG. 4A is a persistence image of a patient's heart, formed using a focussing collimator.

However, when the method and apparatus disclosed in the referenced parent patent application is used on the image data in FIGS. 3A and 4A to computer-identify the position-defining anatomical landmarks (here, the location of the muscles of the left ventricle) of the patient's heart 4, a plot 12 is generated showing those landmarks as identified from data acquired using a parallel-hole collimator and a plot 14 is generated showing that those landmarks as identified from data acquired using a fan-beam collimator. These plots 12 and 14 may then be displayed on the display 10, superimposed on the respective persistence images at the correct locations (see FIGS. 3B and 4B).

Figure 3B:
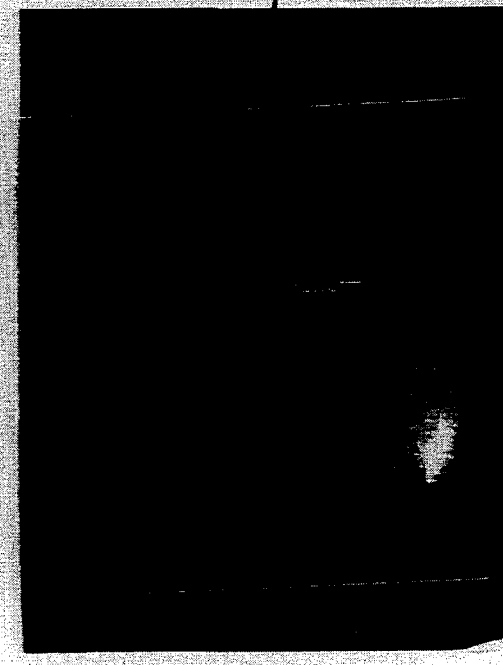
FIG. 3B is a plot of the detected anatomic landmarks in the patient's heart, superimposed upon the image shown in FIG. 3A.

FIGS. 3B and 4B were not in fact generated using persistence data. In these instances, planar images were used, and the left ventricular cardiac muscles were identified by scanning the image and locating the line segments of local maxima, which were taken to represent these muscles. A line segment of local minima was also located, and was taken to lie along the long axis of the left ventricle. (The position of the camera with respect to these detected anatomic landmarks can be determined from them because the geometrical relationships between them are already known.) The resulting computer-identified anatomical landmarks were then plotted and the plots were superimposed upon persistence images.

In accordance with the preferred embodiment of the invention, the relative positions of the patient 2 and the detector 6 of the scintillation camera are adjusted by the technician so that the plot is located in a particular predetermined position on the display 10. Thus, for example, the centroid of the patient's left ventricle may be centered on the display 10, so that when (as in a myocardial perfusion study) the patient's position is to be replicated in a subsequent study, the positioning may be made highly accurately.

Although a preferred embodiment has been described above, the scope of the invention is limited only by the following claims:

We claim:

1. A method of conducting a nuclear medicine study of a target organ within a region of interest within a patient, comprising the following steps:
   identifying, with respect to the target organ, at least two anatomical landmarks of interest;
   commencing the study;
   displaying a persistence image of the region of interest;
   computer-generating plots representing said at least two anatomical landmarks of interest; and
   superimposing said plots on corresponding locations in the persistence image.

2. The method of claim 1, further including the step of carrying out the study in such a manner as to position said plots in a predetermined display position.

3. The method of claim 1, wherein said identifying step comprises the step of identifying said at least two anatomical landmarks from persistence data in a persistence image.

4. Apparatus for conducting a nuclear medicine study of a target organ within a region of interest within a patient, comprising:
   a computerized scintillation camera system for acquiring and storing nuclear medicine images of a patient and for automatically identifying at least two anatomical features of interest with respect to the target organ;
   display means connected to said scintillation camera system and operative for displaying a nuclear medicine persistence image of the region of interest; and
   means connected to said scintillation camera system and operative for automatically generating plots representing said at least two anatomical landmarks of interest and superimposing said plots on said display means at corresponding locations in the persistence image.

* * * * *